US006258404B1

(12) United States Patent
Morgand et al.

(10) Patent No.: US 6,258,404 B1
(45) Date of Patent: Jul. 10, 2001

(54) METHOD AND DEVICE FOR COATING A WIREFRAME ELEMENT WITH A FINE LIQUID DEPOSIT AND COATED OPTICAL FIBER

(75) Inventors: Annie Morgand, Lannion; Jean-Louis Desaunay, Saint Quay Perros; Yves Ruello, Lannion, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/485,133

(22) PCT Filed: Aug. 28, 1998

(86) PCT No.: PCT/FR98/01865

§ 371 Date: Apr. 24, 2000

§ 102(e) Date: Apr. 24, 2000

(87) PCT Pub. No.: WO99/11391

PCT Pub. Date: Mar. 11, 1999

(30) Foreign Application Priority Data

Sep. 1, 1997 (FR) .................................................. 97 11037

(51) Int. Cl.$^7$ ...................................................... B05D 5/06
(52) U.S. Cl. ...................................... 427/163.2; 427/163.1; 427/389.7; 427/421; 427/424; 118/313; 118/315; 118/316; 118/325; 385/123; 385/141; 428/375; 428/378; 428/392
(58) Field of Search ............................. 427/163.1, 163.2, 427/385.5, 389.7, 421, 424; 118/DIG. 22, 300, 313, 315, 316, 325; 385/123, 141; 428/373, 375, 378, 392

(56) References Cited

U.S. PATENT DOCUMENTS

| 4,606,870 | 8/1986 | McGregor . |
| 6,048,913 | * 4/2000 | Yamagishi et al. .................. 523/118 |

FOREIGN PATENT DOCUMENTS

| 0 105 172 | 4/1984 | (EP) . |
| 04139038 | 5/1992 | (EP) . |
| 95 02004 | 1/1995 | (WO) . |

* cited by examiner

Primary Examiner—Shrive Beck
Assistant Examiner—Jennifer Calcagni
(74) Attorney, Agent, or Firm—Merchant & Gould P.C.

(57) ABSTRACT

The invention concerns a method and a device for depositing at least one thin film of a liquid agent on a wireframe element such as an optical fiber designed to form a very fine coating on said wireframe element consisting in spraying the liquid agent on the wireframe element with spraying means, the wireframe element and the spraying means being in relative movement with respect to each other. Preferably, the liquid agent used is obtained from novel acrylphosphorus or metacrylphosphorus compounds. The method is most particularly adapted for coating optical fibers and enables to substantially improve the stress corrosion factor "n" of the fibers and to maintain said factor "n" after aging.

27 Claims, 3 Drawing Sheets

METHOD AND DEVICE FOR COATING A WIREFRAME ELEMENT WITH A FINE LIQUID DEPOSIT AND COATED OPTICAL FIBER

The invention relates to the production of wireframe elements coated with at least one fine film of a coating, such as a protective material, in particular.

The invention relates particularly, but not exclusively, to the production of optical fibres.

Optical fibres are composed of silica and comprise many micro-cracks on their surface. When these fibres are placed under stress (e.g. when they are bent), these cracks are propagated and may cause the rupture of the fibre. This phenomenon is particularly accentuated if the fibre is located in a damp environment. Therefore, it is necessary to protect silica fibres with a waterproof protective coating to increase their stress corrosion factor "n". This factor "n" accounts for the waterproofing and therefore the service life of the fibres: the higher the factor "n", the greater said waterproofing will be.

Conventional optical fibres are generally coated with a double acrylate based polymer coating (a flexible primary coating coated with a rigid secondary coating) and have a factor "n" of approximately 20. Such a double coating has the disadvantage of being relatively permeable to water and various industrial manufacturers have tried to reduce its permeability or deposit a thin waterproof film under it.

In terms of the research on the waterproofing of the coating, the developments in progress known to date thus relate to:

- the use of a primary coating containing an adhesion promoter which improves the fibre's resistance to water and moisture. This primary coating is coated with a conventional secondary coating and would make it possible to obtain a factor "n" of 30;
- the use of a fluorinated secondary coating in which grafting fluorine atoms, a hydrophobic element, onto the urethane-acrylate oligomers present in the base resin improves the fibre's resistance to water and humidity. The factor "n" obtained using such a process is of the order of 40.

However, these two coatings still appear to show a certain sensitivity to humidity.

In terms of the research on the use of a thin waterproof film, the waterproof materials currently available are particularly composed of:

- ceramics such as silicon carbides and nitrides, titanium carbides;
- certain metals such as aluminium, zinc, copper, etc.
- carbon.

Such a thin film generally has a thickness of a few tens of nanometers and is protected by a conventional double coating with a minimum thickness of 40 μm. This type of waterproof deposit makes it possible to obtain a factor "n" greater than 100.

However, it is currently economically difficult to envisage the use of such waterproofing materials, particularly carbon, for the production of optical fibres intended for distribution networks; considerable additional industrialisation is required to reduce their implementation cost.

In terms of the optical fibre production processes known in the state of the art, the double protective coating mentioned above is a photopolymerisable resin deposited on the silica using pressurised dies of a defined diameter according to the thicknesses to be deposited. The silica fibre passes through the centre of these dies continuously supplied with resin. The resins used are viscous (some thousands of mPa.s) to prevent any flow outside the die. This type of process is not suitable for deposits of a thickness less than 10 μm since, for very thin films, the risks of friction of the fibre on the walls of the die are considerable.

The ceramics or carbon used to waterproof the fibre are deposited using a very specific process : the "CVD" ("Chemical Vapor Deposition") process. Such a process requires the use of gaseous reactants. Metals are deposited in the molten state on the silica. Their cooling induces micro-bends and, therefore, high attenuations (10 dB/km). In addition, the deposition speed is limited by the cooling time of the metal.

It is also important to note that to be able to adapt to existing civil engineering works, the optical fibre cables intended for future distribution networks must have a very compact structure. In order to reduce size while enabling good protection of fibres, it is recommended to protect them with the finest possible film with good adhesion qualities on silica while offering a good resistance to water and humidity.

Therefore, this invention aims to propose a resin and an application process on fibre making it possible to reduce the diameter of a fibre while improving its stress corrosion factor "n".

The invention also aims to disclose such a process which eliminates the risk of friction and weakening of the optical fibre during the deposition of the coating.

The invention also aims to propose a resin with improved adhesive properties on silica and, therefore, particularly suitable to form a waterproofing film on a silica fibre.

The invention also aims to propose a process which may use other resins and/or have other applications than optical fibres, such as the deposition of fine coatings, either promoting adherence or uncoupling (coloured or not), the deposition of surface treatment agents or colouring inks, on any type of wireframe element.

Another aim of this invention is to propose a device for the application of such a process which may be easily integrated into state of the art fibre drawing towers used to produce optical fibres. In this respect, it should be noted that state of the art fibre drawing towers are conventionally composed of a preform softening furnace, followed by a cooling system, a silica diameter measuring device, at least one coating deposition die, at least one coating drying furnace, a coated fibre diameter measuring device and a device used to recover and reel the fibre.

These different aims are achieved with the invention which relates to a process for depositing at least one fine film of a liquid agent on a wireframe element designed to form a waterproof coating on said wireframe element, characterised in that it consists of spraying said liquid agent on said wireframe element with spraying means, said wireframe element and said spraying means being in relative movement with respect to each other.

Therefore, the invention proposes to use the spraying of a liquid agent on a wireframe element to coat said element with a fine film of such an agent and offers the advantage of eliminating any contact between the wireframe element and the liquid agent deposition means.

In this respect, it should be noted that spraying is a widely used method to deposit liquid films on large substrates or to mark other objects with large surface areas. However, to the Applicant's knowledge, this process had never been proposed to treat wireframe elements. Since the state of the art spraying processes are applied to large substrate surface areas, they indeed imply little or no loss of the sprayed product. Therefore, their use on wireframe elements, in which significant losses of sprayed product would have been expected, was not an easy task. As explained below, the Applicant has solved this problem by designing a specific device for the application of such a process according to the invention.

It is also important to note that the literature also describes some wire coating processes with liquid agents.

One of these processes consists of passing a wire on inking rollers. Such a process has the disadvantage of involving contact with the wire, making it unsuitable for the deposition of a resin on fibres such as silica fibres (weakening, electrostatics).

Another process consists of passing the wire through a horizontal bath. Such a process is completely unsuitable for the deposition of coatings on optical fibres which move vertically.

A further process consists of passing the wire through a vertical bath, with the wire pulled upwards to prevent of the flow of liquid outside the bath. Since conventional state of the art fibre drawing towers use gravitational fibre movement, it would not be possible to adapt this process to such towers.

Finally, it is also important to note that, in the state of the art, a process consisting of depositing a fluid polymerisable resin on moving silica fibre by stamping has already been proposed. This method was abandoned following problems related to electrostatics and centring of the silica in its coating for high fibre drawing speeds. This actually induced premature polymerisation of the resin before a homogeneous distribution of resin around the silica was obtained.

The process according to the invention may be applied with many types of liquid agents. However, when a particularly thin film of liquid agent is required, particularly for coating silica fibres with a liquid reactant, the liquid agent used may have a viscosity below 100 mPa.s. The use of a liquid agent with a low viscosity makes it possible to spray micro-droplets to obtain improved wetting of the wireframe element and make it possible to obtain fine films thinner that those obtained with state of the art pressurised die deposition.

Also according to a variant of the process, the spraying of said liquid agent on said wireframe element is performed in the form of an essentially conical stream forming an angle α preferably between 1° and 10°. Such a spraying method makes it possible to obtain a very uniform distribution of the liquid agent film deposited on the wireframe element and ensure the deposition even if the fibre moves during fibre drawing.

Advantageously, said spraying of said liquid agent is performed at a distance between 1 mm and 20 mm from said wireframe element and using a pressure of said liquid agent preferably between 0.1 and 2 bar.

According to an interesting variant of the invention, the process comprises a stage consisting of determining the minimum spraying pressure of said liquid agent for which said conical spraying stream is correctly formed, a stage consisting of determining the maximum spraying pressure of said liquid agent for which said wireframe element starts to vibrate under the effect of the spraying and a stage consisting of setting the optimal spraying pressure between said minimum pressure and said maximum pressure and selected according to the movement speed of said wireframe element. The term optimal pressure refers to the pressure at which the wireframe element does not vibrate and for which a film of required thickness is produced at the required movement speed.

As specified above, it will be understood that the process according to the invention may be used to treat any type of wireframe element. However, the process according to the invention is particularly suitable for the coating of silica optical fibres by a liquid agent composed of a polymerisable liquid reactant. According to a particularly interesting variant of the invention, in this case, within the scope of the application of the process, a liquid reactant composed of the following will be used:

at least one acrylophosphorus or methylacrylophosphorus compound with a general formula (I) or a general formula (II):

where,

R represents a hydrogen atom or an alkyl, linear or ramified remnant, with a number of carbon atoms ranging from 1 to 3, and preferably either a hydrogen atom or a methyl radical;

$R^1$ represents an alkyl, linear or ramified remnant, with a number of carbon atoms ranging from 1 to 4 and preferably a $CH_3$- radical or a $CH_3CH_2$- radical;

A represents a hydrogen atom or an alkyl, linear or ramified remnant, with a number of carbon atoms ranging from 1 to 3 or another phosponate group —P(O) $(OR^1)_2$ and preferably represents —P(O) $(OCH_3)_3$ or —P(O) $(OEt)_2$;

n and n' are numbers which may have identical or different values equal to 1, 2 or 3;

m may be equal to 0, 1, 2 or 3.

at least one acrylate diluent.

Indeed, it was discovered that compounds with the general formulas (I) or (II) have improved adhesive qualities with respect to silica and thus make it possible to improve the factor "n" of the fibre using very thin deposited layers (a few hundred nanometers to a few micrometers).

Preferably, said compound is selected from the group composed of compounds with the following formulas:

-continued

(B)

(C)

(D)

(E)

(F)

(G)

Although it is possible to envisage the use of any type of acrylate diluent to produce the above-mentioned liquid reactant, said diluent will be advantageously selected from the group composed of phenoxyethyletheracrylate, ethoxyethylacrylate, ethoxyethoxyethylacrylate, trimethylolpropanetracrylate and isobornylacrylate.

According to a preferable variant of the invention, said liquid agent used is a photopolymerisable liquid reactant comprising at least one photocatalyst compound. However, it is important to note that it will be possible to envisage the use of reactants able to polymerise under the effect of a factor other than light.

Advantageously, the process according to the invention also comprises an additional stage consisting of forming at least one conventional or practically conventional protective coating film of a thickness less than 60 $\mu$m, preferably less than 40 $\mu$m, on said wireframe element coated with said fine film. Therefore, the fibres coated according to the process recommended by the invention will have a diameter less than the diameters obtained using the state of the art techniques and will make it possible to reduce the size of the corresponding cables.

The invention also relates to a device for the process described above, with this device characterised in that it comprises means to spray at least one liquid agent on a wireframe element.

According to the preferred application of such a device, the spraying means are incorporated into a spraying chamber delimiting a spraying enclosure fitted with an inlet and an outlet and inside which said wireframe element moves essentially vertically. Such an enclosure is used to delimit a defined spraying volume and prevent projections of liquid agent during the operation. Advantageously, said inlet of the spraying chamber may have a conical shape for easier insertion of the wireframe element into the chamber.

Advantageously, the spraying means include at least two spraying nozzles used to distribute said liquid agent according to a spraying cone. According to a preferred application, three spraying nozzles equally distributed around said wireframe element are used and these nozzles have an outlet of a diameter between a few tens to a few hundred microns. Such means enable conical distribution of the stream, with the cone formed inclined at an angle (which may be symbolised by the angle formed by the longitudinal axes of the nozzles and the moving fibre) preferably between 20° and 90°.

According to a particularly interesting variant of the invention, said spraying chamber is equipped with an excess sprayed liquid agent recovery trough, said spraying means include at least one container of said liquid agent and the device comprises means to redirect the recovered liquid agent in said trough to said container. It is thus possible to work in a closed circuit to prevent any loss of sprayed liquid agent.

This invention also relates to any optical fibre characterised in that it is composed of silica coated with at least one fine film produced from a liquid reactant and obtained using the process described above.

According to one variant, said fine film is deposited directly on the silica.

According to another variant, said fine film forms:
an intermediate film between two conventional or practically conventional coatings, or
an external protective film provided on a conventional or practically conventional coating.

Preferably, said fine film has a thickness between a few hundred nanometers and a few micrometers.

BRIEF DESCRIPTION OF THE DRAWINGS

It will be easier to understand the invention and the advantages it offers using the following description of non-restrictive examples of applications with reference to the drawings, in which.

DETAILED DESCRIPTION OF THE INVENTION

Spraying Device

Figure 1:
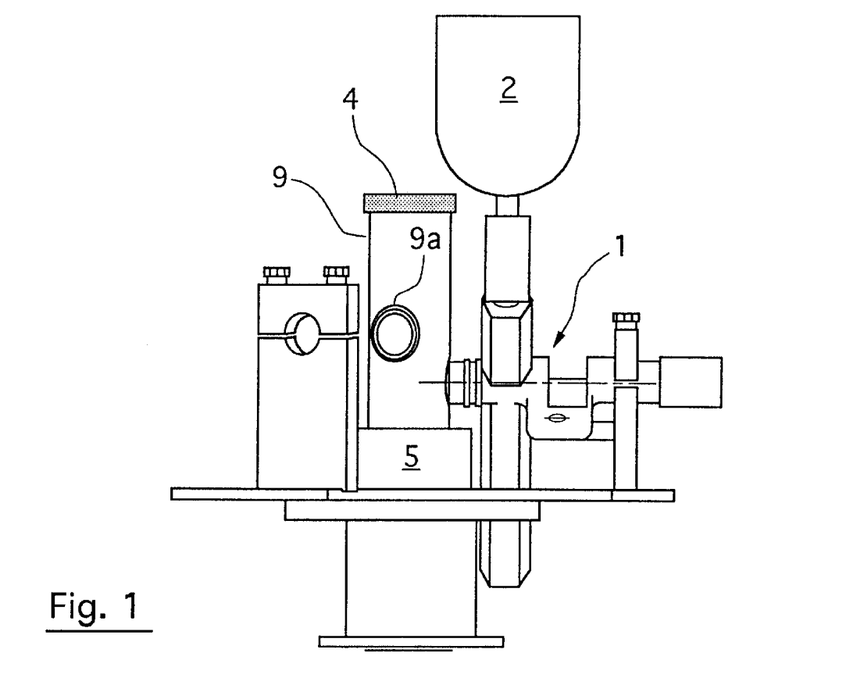
FIG. 1 represents a front view of a device to spray a liquid agent on a wireframe element according to the invention only showing one spray gun, to ensure the clarity of the description.
Figure 2:
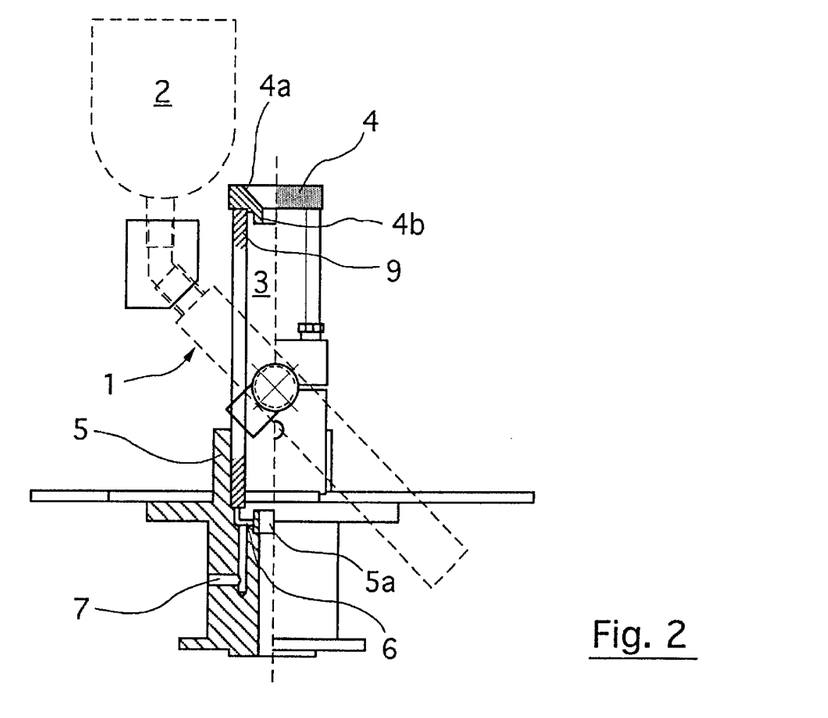
FIG. 2 represents a partial section front view of the device shown in FIG. 1.
Figure 3:
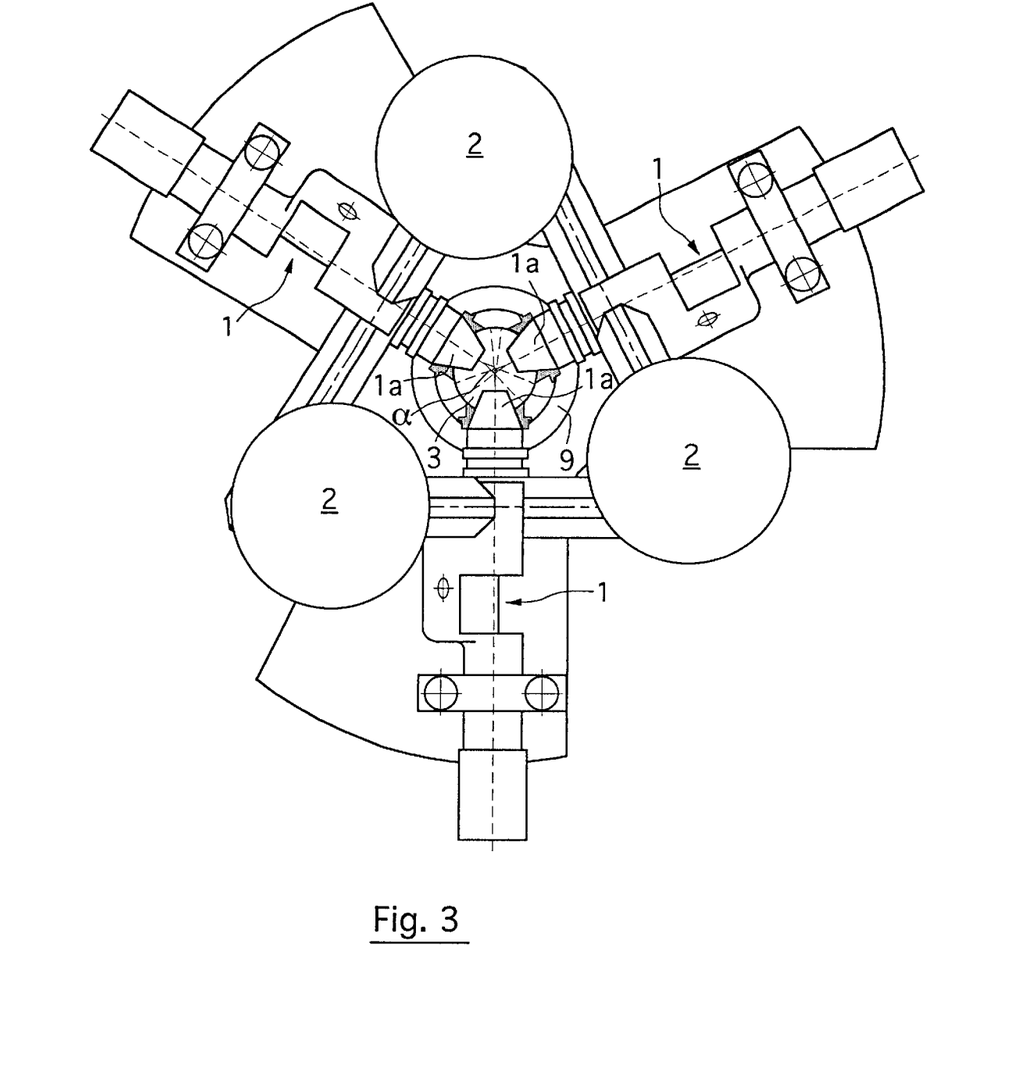
FIG. 3 represents a top view of the spraying device on which three spray guns are shown.

With reference to FIGS. 1 to 3, the wireframe element spraying device according to the invention has three spray guns 1 each with a liquid agent container 2 (on FIGS. 1 and 2, a single spray gun 1 and its container 2 are represented). It should be noted that in other applications, it will be possible to use a common container for all the spray guns.

With reference more specifically to FIG. 3, the end of these spray guns is fitted with a spraying nozzle 1a. According to the applications, the nozzles will preferably have a diameter from a few tens to a few hundreds of microns.

The nozzles 1a are positioned in offset planes. The product is sprayed in the form of very fine droplets which offer the advantage of improved dispersion on the fibre. The projected stream is conical which makes it possible to compensate for any movements of the fibre which may occur during fibre drawing. In the represented application, the conical stream forms an angle α of a few degrees.

The nozzles 1a are inserted in a spraying chamber 3 delimited by an enclosure 9, a cap 4 positioned on top of said enclosure 9 and a cap 5 positioned under said enclosure 9.

The enclosure 9 has positioning holes 9a for the nozzles 1a waterproofed with seals 1b.

With reference to FIG. 2, the cap 4 is pierced with a channel 4b used to insert the wireframe element and fitted with a conical inlet 4a at the top. According to the applications, the diameter of this inlet may vary from a few hundred microns to a few millimeters.

The cap 5 is equipped with an outlet 5a and a trough 6 used to recover the excess product sprayed against the walls of the enclosure 9 by the spray guns 1. The trough is connected to an evacuation circuit 7 connected to a product return system (not shown) to the containers 2.

Therefore, the spraying chamber 3 makes it possible to:

protect the environment from the liquid agent sprayed around the wireframe element;

recover the excess product sprayed around the wireframe element, using the trough 6.

According to the applications of the device, the nozzle-wireframe element distances, the angle α and the sprayed liquid agent supply pressure are optimised as a function of the number and type of spray guns or nozzles used and according to the required coating thickness; when these initial parameters are set, it is necessary to define:

the minimum liquid agent pressure for which the conical stream is uniform and correctly formed;

the maximum liquid agent pressure for which the fibre starts to vibrate under the effect of the air leaving the nozzles.

The pressure is then modified as a function of the fibre drawing speed.

In addition, it should be noted that all the elements of the device are produced using resin-resistant and UV-opaque materials.

Figure 4:
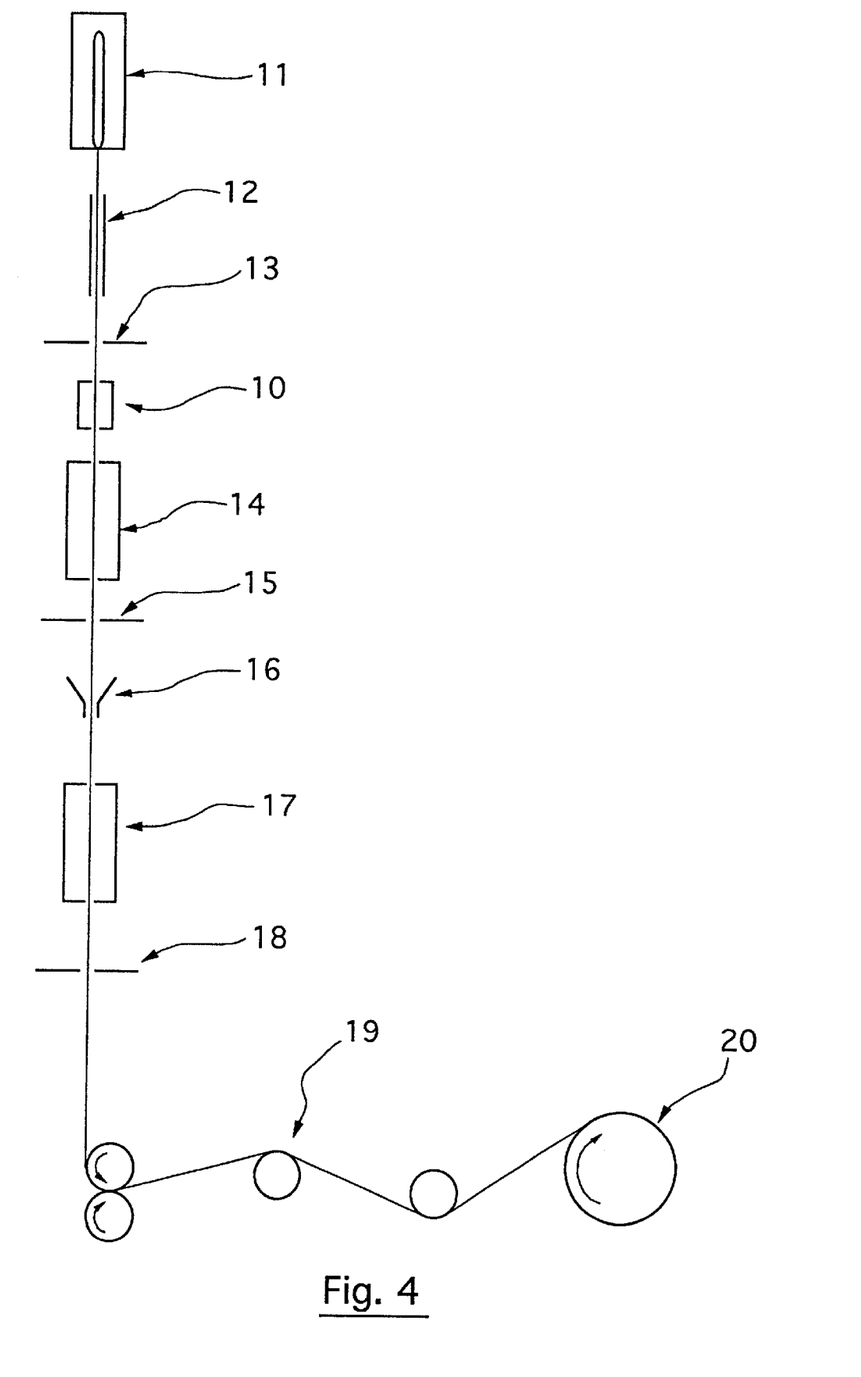
FIG. 4 represents a schematic view of an optical fibre drawing tower incorporating a spraying device such as that represented in FIGS. 1 to 3.

The device represented in FIGS. 1 to 3 can easily be incorporated in an optical fibre drawing tower, as represented in FIG. 4, to spray a photopolymerisable liquid reactant in the form of a fine film of a thickness between a few hundred nanometers and a few micrometers.

With reference to FIG. 4, such a die conventionally comprises from bottom to top:

a furnace 11 in which the preform is softened;

a cooling system 12 for the silica fibre leaving the furnace 11;

a first diameter measuring device 13 used to measure the diameter of the fibre before coating;

a first device to deposit a first film of coating on the fibre;

a UV furnace 14 used to polymerise and thus harden the coating film deposited on the fibre using the first deposition device;

a second diameter measuring device 15 used to measure the diameter of the fibre coated with the first film of coating;

a pressurised die 16 to deposit a second film of coating on the fibre;

a second UV furnace 17 used to polymerise and thus set the second coating film deposited on the fibre using the pressurised die 16;

a third diameter measuring device 18 used to measure the diameter of the fibre coated with the first coating film and the second coating film;

an assembly 19 used to receive the fibre moving gravitationally in the above-mentioned elements and including a reel 20.

In compliance with this invention, the first deposition device is composed of a spraying device 10 as described with reference to FIGS. 1 and 2 and is used to deposit a liquid reactant on the fibre in the form of a thin film with a thickness which may vary from a few hundred nanometers to a few micrometers. It should be noted that, in other applications, it will also be possible to incorporate several successive spraying systems.

The pressurised die 16 is used to form an additional coating of a thickness less than 60 μm, preferably less than 40 μm, on the fibre. In this respect, it is important to note that it will be possible to use a second die on the fibre drawing tower to deposit a third coating film. It is also important to note that it will also be possible to spray, deposit the protective coating and polymerise the two films simultaneously.

Resins

The spraying device described with reference to FIGS. 1 and 2 was used to spray a fine film of various photopolymerisable liquid reactants on silica optical fibres. The composition of these liquid reactants is given in examples 1 and 2 below.

EXAMPLE 1

A mechanical mixture of the formula A compound mentioned above was produced in a solution composed of approximately equal parts of isobornylacrylate and phenoxyethylacrylate.

The quantity of compound A incorporated in these mixtures was 20% by weight.

The liquid obtained had a viscosity of approximately 10 mPa.s and proved to be homogeneous and stable over time (no segregation after several months).

A standard photocatalyst for UV polymerisation was added to this liquid, in standard proportions by weight.

EXAMPLE 2

The formula E compound mentioned above was mixed with the phenoxyethyletheracrylate/isobornylacrylate mentioned in example 1 according to the same proportion as in this example. The resin obtained also proved to be liquid, homogeneous and stable with a viscosity of approximately 10 mPa.s. A photocatalyst compound for UV polymerisation was added to it.

In order to evaluate the technical characteristics of the coating obtained in this way, the liquid reactants were also sprayed on silica plates and the results obtained were compared to the results obtained with deposits on silica plates on conventional coating resins (950-106 and 950-108 produced by DSM) and the solution essentially composed of the phenoxyethyletheracrylate/isobornylacrylate/photocatalyst mixture.

Within this scope, the adhesion properties on silica and UV-reactivity properties of earlier resins and the resins according to examples 1 and 2 were evaluated.

The adhesion test was conducted according to the standard NFT-30.038 for thin films according to which:

a fine film of resin (approx. 10 μm) is deposited on a silica plate using a calibrated roller;

a grid is produced on the polymerised resin with a standardised comb; and, the adhesion is evaluated according to the separation observed after placing a standardised adhesive tape on the section with the grid.

This adhesion test, performed after ageing for 48 hours at 60° C. and 95% relative humidity, 48 hours in water at 60° C., followed by leaving to stand for 2 hours at 23° C. and 50% relative humidity, demonstrated that, unlike the reference resins, the new resins were not separated from the silica plates. Therefore, these new resins have an improved adhesion on silica which is retained after ageing with water and humidity.

The UV reactivity was studied using a photocalorimeter (DPA Parkin Elmer) which provides an exothermal peak during the polymerisation of the resin and is used to measure the reaction start and end times using the peak obtained.

The results obtained demonstrated that the UV reactivity of the new resins was equivalent to that of the reference resins. Since the deposited thickness of the resins according to the invention on optical fibres was significantly less than that of conventional coatings (over 50 times less), this offers the major advantage of being able to use significantly lower UV powers within the scope of the invention. Therefore, the new resins proposed in this invention are therefore well suited to current fibre drawing conditions. In addition, they require lower UV powers than conventional resins, which makes it possible:

either to increase fibre drawing speeds without adding UV furnaces;

or reduce, for a given speed, the number of furnaces required, which provides a gain on production costs.

Optical Fibres

The spraying device described above with reference to FIGS. 1 and 2 was used to spray the resins given in examples 1 and 2 on a moving silica fibre.

It was incorporated on the fibre drawing tower instead of the conventional dies as shown in FIG. 3. Its size is similar to that of the dies and die-holders.

Since the coating formed is very fine, it was protected mechanically by a practically conventional coating resin.

In this respect, it should be noted that, in the prior art, it was known how to use two protective films, i.e. one flexible primary film, used to damp stresses and shocks (Young's modulus 2 to 500 MPa, vitreous transition temperature: −20° C.) and one harder secondary film resistant to abrasion (Young's modulus 20 to 2000 MPa, vitreous transition temperature at around 60° C.).

In this application example of the invention, it was chosen to use not two protective films but only one with intermediate characteristics. Such an "intermediate" coating was applied on fibres with a maximum thickness of 30 to 60 μm, with the fibre drawing speed set to 100 m/min. It has the following visco-elastic characteristics:

vitreous transition temperature: 40° C.

Young's modulus: 10 to 1000 MPa viscosity: 5000 mPa.s at 25° C.

The liquid resins were sprayed using the following parameters:

nozzle diameter: a few hundred microns;

sprayed product flow rate: of the order of 1 cm3/min;

nozzle-fibre centre distance: a few millimeters.

Such parameters made it possible to obtain a homogeneous thickness of the order of one micron. This thickness was measured by electron microscopy and AFM on samples of film with no protective coating.

Four fibres underwent a Weibull and factor "n" analysis. With reference to conventional fibres, they offer:

an equivalent rupture strength;

an considerably higher initial factor "n" which is not degraded after accelerated ageing for 30 days at 85° C. and 85% relative humidity (measurements made after leaving to stand for 24 hours at 23° C. and 50% relative humidity).

It was also checked that the fibres are easy to strip and connect with attenuations less than 0.1 dB.

The applications of the invention described above are not restrictive. Therefore, many modifications may be made within the scope of the invention.

In terms of the spraying device, any of the means represented may be replaced by any equivalent means. A different number of nozzles may also be used.

The process and device recommended by the invention may be used to spray resins other than the resins mentioned in examples 1 and 2.

What is claimed is:

1. A process for depositing at least one thin film of a liquid agent on a wireframe element designed to form a coating on said wireframe element, said process comprising:

spraying said liquid agent on said wireframe element with spraying means, while said wireframe element arid said spraying means are in relative movement with respect to each other, said liquid agent comprising a polymerizable liquid reactant comprising:

at least one acrylophosphorus or methylacrylophosphorus compound with a formula (I) or a formula (II):

where,

R represents a hydrogen atom or an alkyl, linear or ramified remnant, with a number of carbon atoms ranging from 1 to 3;

$R^1$ represents an alkyl, linear or ramified remnant, with a number of carbon atoms ranging from 1 to 4;

A represents a hydrogen atom or an alkyl, linear or ramified remnant, with a number of carbon atoms ranging, from 1 to 3 or another phosphonate group $-P(O)(OR^1)_2$;

n and n' are number, which may have identical or different values equal to 1, 2 or 3;

m may be equal to 0, 1, 2, or 3; and at least one acrylate diluent.

2. The process of claim 1, wherein said liquid agent has a viscosity less than 100 mPa.s.

3. The process of claim 1, wherein said liquid agent is sprayed on said wireframe element in the form of a conical stream.

4. The process of claim 3, wherein said conical stream forms an angle α between 1° and 10°.

5. The process of claim 1, wherein said spraying is performed at a distance between 1 mm and 20 mm from said wireframe element.

6. The process of claim 1, wherein said spraying stage is performed using a pressure between 0.1 and 2 bar.

7. The process of claim 3, further comprising steps of:

determining a minimum spraying pressure for which said conical spraying stream is correctly formed;

determining a maximum spraying pressure for which said wireframe element starts to vibrate under the effect of the spraying; and setting an optimal spraying pressure between said minimum pressure and said maximum pressure selected according to the movement speed of said wireframe element.

8. The process of claim 1, wherein said compound is selected from the group consisting of:

(A)

(B)

(C)

(D)

-continued (E)

(F)

(G)

9. The process of claim 1, wherein said liquid reactant is sprayed on said wireframe element to form a film of a thickness between of a few hundred nanometers and a few micrometers.

10. The process of claim 1, wherein said acrylate diluent is selected from the group consisting of phenoxyethyletheracrylate, ethoxyethylacrylate, ethoxyethoxyethylacrylate, trimethylolpropanetracylate and isobornylactylate.

11. The process of claim 1, wherein said photopolymerisable liquid agent also comprises at least one photocatalyst compound.

12. The process of claim 1, further comprising a step of forming at least one secondary coating film of a thickness less than 60 μm on said wireframe element.

13. The process of claim 1, wherein said wireframe element moves vertically.

14. A device for applying the process of claim 1, the device comprising spraying means to spray at least one liquid agent on a wireframe element, with said spraying means comprising at least three spraying nozzles equally distributed around said wireframe element.

15. The device of claim 14, wherein said spraying means are incorporated in a spraying chamber fitted with an inlet and an outlet and inside which said wireframe element moves vertically.

16. The device of claim 14, wherein said nozzles have an outlet of a diameter between a few tens and a few hundred microns.

17. The device of claim 15, wherein said spraying chamber comprises an excess sprayed liquid agent recovery trough.

18. The device of claim 17, wherein said spraying means comprises at least one container of said liquid agent and means to redirect the recovered liquid agent in said trough to said container.

19. An optical fiber drawing tower comprising the device of claim 14.

20. An optical fiber comprising a silica core coated with at least one fine film produced from a liquid reactant of a thickness between a few hundred nanometers and a few micrometers obtained using the process of claim 1.

21. The optical fiber of claim 20, wherein said fine film is deposited directly on the silica.

22. The optical fiber of claim 20, further comprising at least one coating film, wherein said fine film forms either an intermediate film between two coating films, or an external protective film provided on a coating film.

23. The optical fiber of claim 20, wherein said fine film has a thickness between a few hundred nanometers and a few micrometers.

24. The process of claim 1, wherein R comprises a hydrogen atom or a methyl radical.

25. The process of claim 1, wherein $R^1$ comprises a $CH_3$- radical or a $CH_3CH_2$- radical.

26. The process of claim 1, wherein A comprises —P(O) $(OCH_3)_3$ or —P(O) $(OEt)_2$.

27. The process of claim 12, wherein the secondary coating film has a thickness of less than 40 μm.

* * * * *